United States Patent [19]

Previte

[11] 4,100,813

[45] Jul. 18, 1978

[54] FLEXURE SUSPENSION ASSEMBLY

[75] Inventor: Peter Luciano Previte, Paterson, N.J.

[73] Assignee: The Singer Company, Little Falls, N.J.

[21] Appl. No.: 686,127

[22] Filed: May 13, 1976

[51] Int. Cl.$^2$ ............................................. G01C 19/02
[52] U.S. Cl. .................................... 74/5 F; 64/27 R; 308/2 A
[58] Field of Search ................. 74/5 F; 64/11, 15, 27; 308/2, 2 A; 29/443, 445; 287/185

[56] References Cited

U.S. PATENT DOCUMENTS

| | | | |
|---|---|---|---|
| 3,543,301 | 11/1970 | Barnett | 74/5 F |
| 3,585,866 | 6/1971 | Ensinger | 74/5 F |
| 3,614,894 | 10/1971 | Ensinger | 74/5 F |
| 3,678,764 | 7/1972 | Erdley et al. | 74/5 F |
| 3,700,289 | 10/1972 | Bilinski et al. | 74/5 F |
| 3,700,290 | 10/1972 | Ensinger | 74/5 F |
| 3,700,291 | 10/1972 | Hadland | 74/5 F |
| 3,856,366 | 12/1974 | Weisbord et al. | 74/5 F |
| 3,943,778 | 3/1976 | Wyse | 74/5 F |

*Primary Examiner*—C. J. Husar
*Attorney, Agent, or Firm*—Thomas W. Kennedy

[57] ABSTRACT

A flexure suspension assembly is provided for coupling the rotatable spin shaft and flywheel of gyroscopes of the type having relative angular rotation between the shaft and flywheel about two precession axes orthogonally related to the spin axis. A cylindrical central spin shaft mounting member is coupled by a first pair of single axis flexure joints to a first bifurcated gimbal member to permit angular rotation of the gimbal about one precession axis and is coupled by a second pair of single axis flexure joints to a second bifurcated gimbal member to permit angular rotation of the second gimbal about the other precession axis. The gimbal members are interleaved and form segments of an annulus concentrically disposed about the central mounting member. An annular flywheel mounting member is concentrically disposed about the annulus and is connected to the first gimbal member by a third pair of single axis flexure joints which permit angular rotation of the annular mounting member with respect to the first gimbal about said other precession axis and is also connected to the second gimbal by a fourth pair of single axis flexure joints which permit relative angular rotation between the annular mounting member and second gimbal about said one precession axis.

12 Claims, 5 Drawing Figures

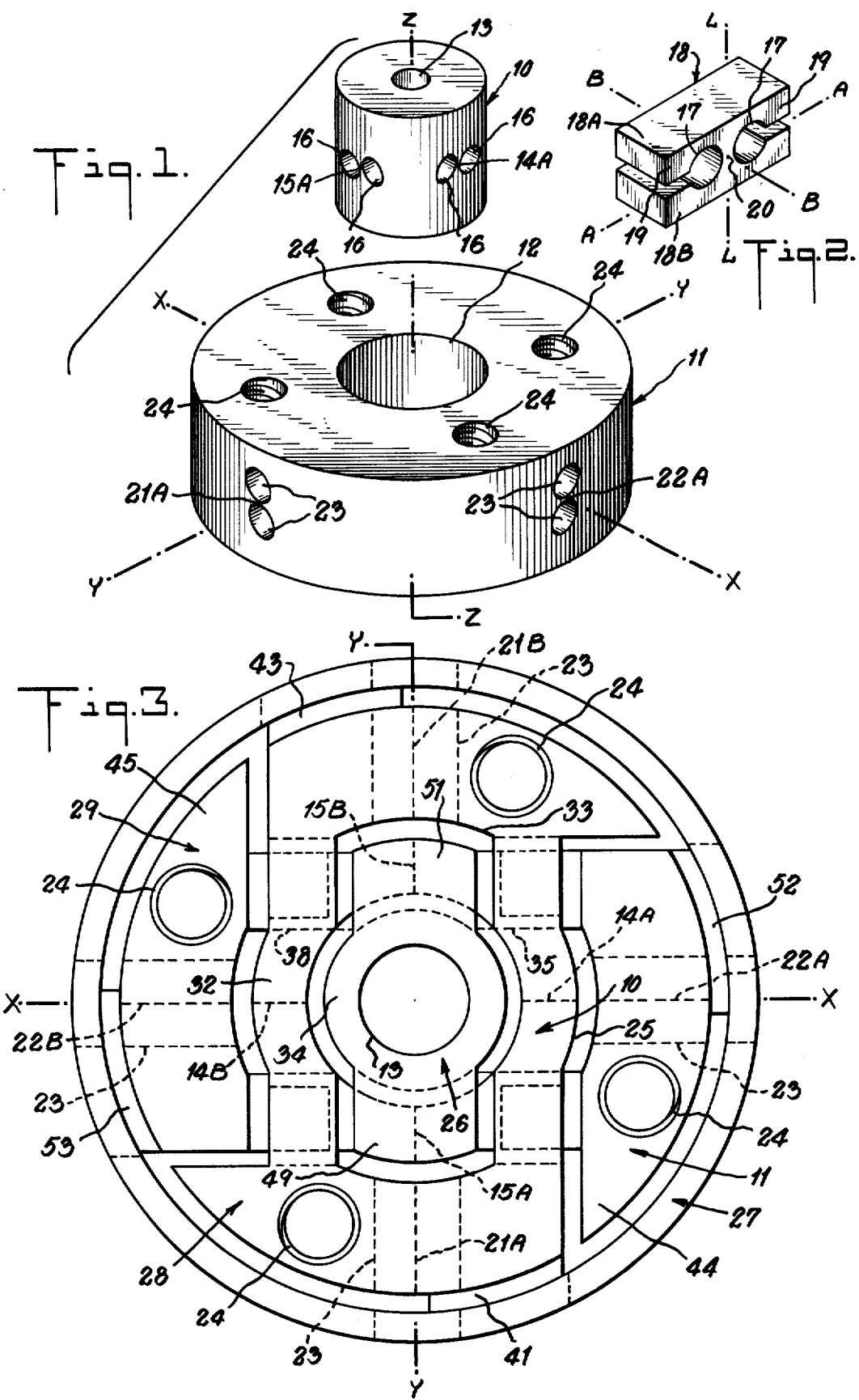

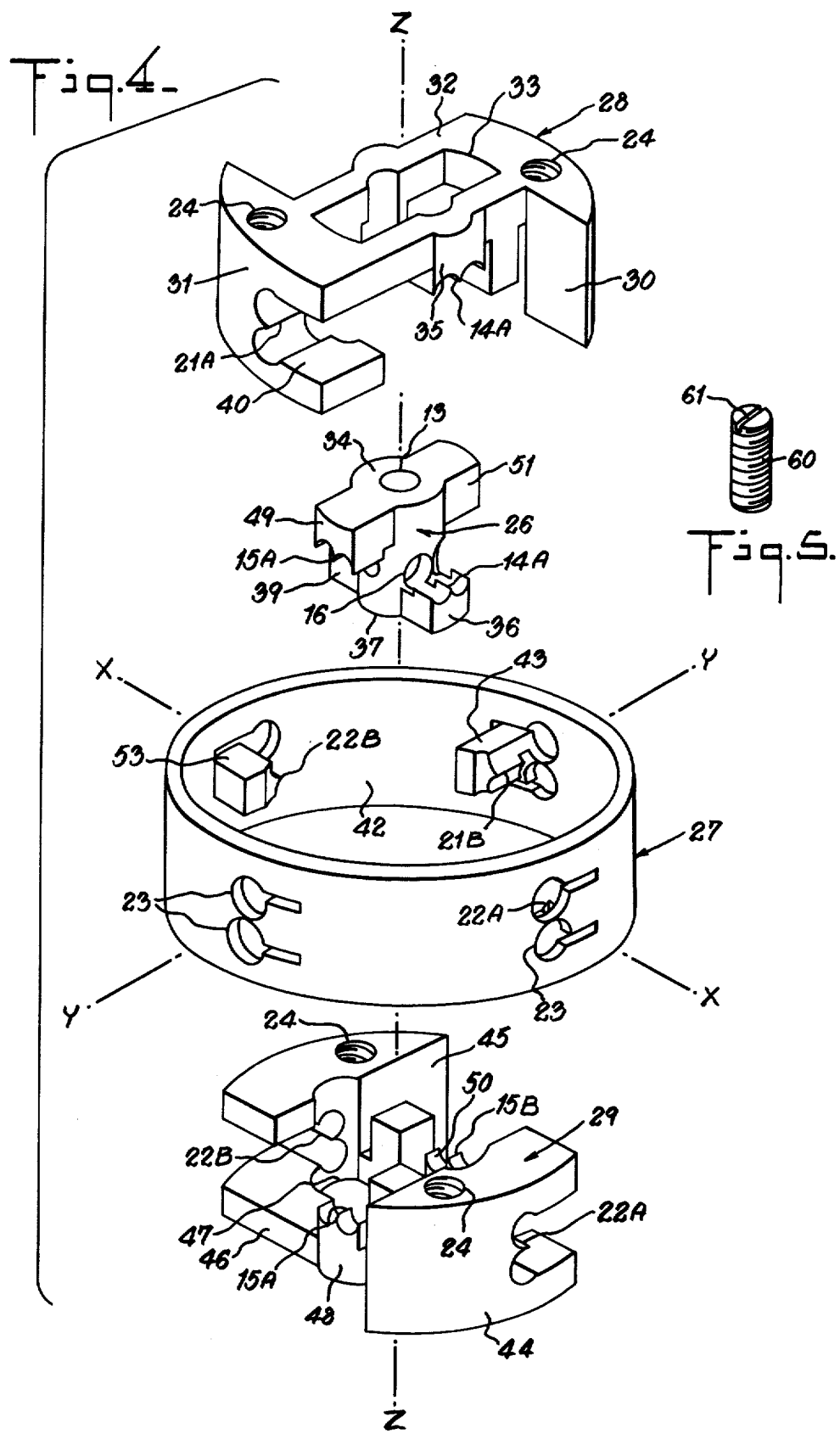

FLEXURE SUSPENSION ASSEMBLY

BACKGROUND OF THE INVENTION

1. Field of the Invention

This invention relates to flexure suspension assemblies for inertial devices such as gyroscopes and the like and more particularly to a flexure suspension assembly having two degrees of angular rotational freedom and to a method of making the same.

2. Description of the Prior Art

Certain types of gyroscopes and other inertial sensing devices employ a flexure suspension assembly to connect a rotatable spin shaft to a flywheel or inertial member so that the flywheel or inertial member may be brought up to a suitably high speed by rotation of the spin shaft. The spin shaft is fixedly mounted against angular rotation but the flywheel of the gyroscope or other inertial device must be free to "precess" or angularly rotate about two precession axes which are orthogonally related to the spin axis of the spin shaft. Accordingly, the flexure suspension assembly must be rotatable about the spin axis and must have 2° of angular rotational freedom about the two precession axes. The suspension assembly must also provide adequate axial structural support for the flywheel, since the weight of the flywheel is ultimately borne by the spin shaft. When the spin shaft is rotated to bring the flywheel to full spin speed, the suspension assembly must provide the required radial support. Accordingly, the flexure suspension assembly provides both axial and radial support for rotation of the flywheel. The support provided must prevent translatory movement of the flywheel with respect to the spin shaft along the spin axis and the two orthogonally related precession axes when the gyroscope or other inertial device is subjected to external acceleration forces along these axes. The foregoing structural support must be provided, however, without imposing substantial flexural restraints on the angular rotation of the flywheel about the two precession axes or error torques will be produced during gyroscope operation which will degrade the accuracy of the gyroscope output information.

Flexure suspension assemblies have been produced by a number of different methods which utilize the formation of single axis flexure joints. Single axis flexure joints are essentially thin sections of metal or other suitable material of which the suspension assembly is made which may be bent or flexed about only a single axis. A single axis flexure joint may be formed by drilling or otherwise forming a pair of closely spaced parallel holes in a member and separating the member into two portions which are joined only by the thin section of material between the closely spaced holes. This will produce a flexure joint which may be bent or flexed about a single bending axis which is midway between the holes and is parallel to the two longitudinal axes of the holes. The longitudinal axis of the flexure joint would then be perpendicular to the bending axis and would be located equidistantly between the two holes.

A known method of producing a flexure suspension assembly having single axis flexure joints involves the use of a single cylindrical member in which four single axis flexure joints are distributed about the periphery of the member at 90° intervals by the boring of four pairs of closely spaced and radially separated holes. The longitudinal axes of these flexure joints are substantially parallel to the longitudinal axis of the cylinder and the bending axes are radially disposed. The single cylinder is then separated by known techniques into spin shaft and flywheel mounting members and gimbal members which are interconnected by eight single axis flexure joints all having their longitudinal axes parallel to the longitudinal cylinder axis. In the resulting flexure suspension assembly, the flywheel is supported radially by four of the axially-extending flexure joints loaded in shear. Axial support for the flywheel is provided by all of the eight axial flexure joints loaded in tension. Although the resulting suspension assembly provides good axial support for the flywheel, it has the disadvantage of providing poor radial support. In order to increase the radial support provided by this type of suspension assembly, the single axis flexure joints must be made stronger. However, the strengthening of the flexure joints also increases the stiffness of the joints and increases the flexural restraints imposed by the suspension assembly upon the flywheel for angular rotation about the gyroscope precession axes. Although the error torques resulting from the increased flexural restraints could be minimized by adjusting or tuning the moments of inertia of the gimbal members of the assembly, the tuning is made very difficult by the increased stiffness of the flexure joints.

Other methods of making flexure suspension asemblies involve the use of two separate cylindrical members which are individually separated or machined into the requisite number of flexure joints and other component parts of the flexure suspension assembly prior to joining. After each cylindrical member has been separated into its share of the component parts of the assembly, the machined members are joined together at the flexure joints produced in each member to produce the final flexure suspension assembly. This method also produces a suspension assembly which suffers from the structural disadvantages of the assemblies produced by the single cylinder method. Additionally, the known methods and suspension assemblies utilize a technique for mounting the flexure suspension assembly on the gyroscope spin shaft wherein a connecting shaft is formed or machined as a part of the spin shaft mounting member. The connecting shaft is then blind cemented into a recess in the gyroscope spin shaft. With this arrangement, the distribution of the flywheel inertial load is no longer centrally located at the shaft mounting surface but is instead cantilevered away from the cement joint mounting surface. This may produce a source of gyroscope drift errors which would not exist if the flexure suspension assembly could be centrally mounted on the gyroscope spin shaft with the flywheel inertial load evenly supported at the shaft mounting surface.

SUMMARY OF THE INVENTION

It is an object of the invention to provide a flexure suspension assembly for coupling the rotatable spin shaft and flywheel of inertial devices and the like which exhibits a high degree of structural strength and provides good axial and radial support for the flywheel.

It is a further object of this invention to provide a flexure suspension assembly for inertial devices and the like wherein good radial and axial support are provided for the flywheel of the device without the imposition of substantial flexural restraints on the operation of the inertial device.

It is a still further object of this invention to provide a flexure suspension assembly which includes means for tuning the moments of inertia of the gimbal members of the assembly.

It is another object of this invention to provide a flexure suspension assembly which is mechanically rugged in construction, imposes low flexural restraints and may be fabricated by an easily practiced method of making the same.

It is an additional object of this invention to provide a flexure suspension assembly for coupling the spin shaft and flywheel of inertial devices and the like which permits central mounting of the flexure suspension assembly to the inertial device spin shaft, so that the inertial load is evenly supported by the shaft mounting surface.

It is still another object of this invention to provide a method of making two degree of angular rotational freedom flexure suspension assemblies which is easily practiced and which produces a flexure suspension assembly having superior structural strength and operational characteristics.

It is an additional object of this invention to provide a method of making two degree of freedom flexure suspension assemblies in which two cylinders are utilized but all separational work is carried out after the two cylinders are joined, so that delicate component parts need not be handled prior to joining and are protected from mishandling.

Briefly, the flexure suspension assembly of the invention comprises first mounting means adapted to be coupled to the inertial device spin shaft for rotation therewith about the spin axis and first gimbal means coupled by first single axis flexure joint means to the first mounting means for rotation therewith about the spin axis. The longitudinal axis of said first flexure joint means is substantially parallel to the spin axis and the bending axis thereof is aligned with one of the precession axes to permit relative angular rotation between the first gimbal means and the first mounting means about said one precession axis. Second single axis flexure joint means couple second gimbal means to said first mounting means for rotation therewith about the spin axis. The longitudinal axis of the second flexure joint means is substantially parallel to the spin axis and the bending axis is aligned with the other of said precession axes to permit relative angular rotation between the second gimbal means and the first mounting means about said other precession axis. The assembly also comprises second mounting means adapted to be coupled to the inertial device flywheel. Third single axis flexure joint means having the longitudinal axis thereof substantially perpendicular to the spin axis and the bending axis thereof aligned with said other precession axis couple the second mounting means to the first gimbal means and fourth single axis flexure joint means having the longitudinal axis thereof substantially perpendicular to the spin axis and the bending axis thereof aligned with said one precession axis couple the second mounting means to the second gimbal means, whereby the first and second mounting means are coupled for rotation together about the spin axis and for relative angular rotation therebetween about both of the precession axes. Means mounted on each of the first and second gimbal means may also be provided to adjust the moment of inertia of the gimbal means.

The invention also contemplates a method of making the foregoing flexure suspension assembly which has two degrees of angular rotational freedom about first and second axes which are perpendicular to each other and to a reference axis. The method comprises the steps of making first and second pairs of radially disposed single axis flexure joints in a first cylindrical member and third and fourth pairs of radially disposed single axis flexure joints in a second cylindrical member having a central concentrically disposed aperture therein adapted to receive the first member. The flexure joints of each of said first and second pairs are disposed on opposite sides of the first member and have the bending axes thereof in axial alignment and the longitudinal axes thereof substantially parallel to the longitudinal axis of said first member. The bending axes of the first and second pairs of joints are orthogonally related to the longitudinal axis of the first member. The flexure joints of each of the third and fourth pairs are disposed on opposite sides of the central aperture in the second member and have the bending axes thereof in axial alignment and the longitudinal axes thereof substantially perpendicular to the longitudinal axis of the second member. The bending axes of the third and fourth pairs of joints are orthogonally related to the longitudinal axis of the second member. The next step comprises joining the first member to the second member with the first member concentrically disposed in the central aperture of the second member to form a cylindrical, integrally-connected composite member having a longitudinal axis coincident with the reference axis and the bending axes of the first and fourth pairs of flexure joints coincident with the first axis and the bending axes of the second and third pairs of flexure joints coincident with the second axis. Finally, the cylindrical composite member is separated into a cylindrical inner mounting member having the longitudinal axis thereof coincident with the reference axis, an annular outer mounting member concentrically disposed about the inner mounting member and separated therefrom by an annular section of the composite member, a first gimbal member comprising a first segment of the composite member annular section coupled by the first pair of flexure joints to the inner mounting member and by the third pair of flexure joints to the outer mounting member, and a second gimbal member comprising a second segment of the composite member annular section coupled by the second pair of flexure joints to the inner mounting member and by the fourth pair of flexure joints to the outer mounting member, so that relative angular rotation between the inner and outer mounting members is permitted about said first and second axes. Each flexure joint of the first and second pairs of flexure joints may be made by boring a pair of radially disposed, closely spaced and radially separated holes in the first cylindrical member while each flexure joint of the third and fourth pairs of flexure joints may be made by boring a pair of radially disposed, closely spaced and radially aligned holes in the second cylindrical member.

The nature of the invention and other objects and additional advantages thereof will be more readily understood by those skilled in the art after consideration of the following detailed description taken in conjunction with the accompanying drawings.

BRIEF DESCRIPTION OF THE DRAWINGS

In the drawings:

FIG. 1 is a perspective view showing the two cylindrical members used in the method of the invention prior to being joined;

FIG. 2 is a perspective view of a single axis flexure joint of the type used in the method and apparatus of the invention;

FIG. 3 is a top plan view of the two cylindrical members shown in FIG. 1 of the drawings after joining into a composite member and after separation of the composite member into the component parts of the flexure suspension assembly of the invention has been completed;

FIG. 4 is an exploded perspective view showing the flexure suspension assembly of the invention after separation of the composite member has been completed and with the individual components broken apart at the eight flexure joints for convenience of illustration; and FIG. 5 is a perspective view of a threaded balance weight which may be used with the gimbal members to tune the moments of inertia thereof.

DESCRIPTION OF THE PREFERRED EMBODIMENT OF THE INVENTION

The flexure suspension assembly of the invention will first be described by reference to the method of making the same. As seen in FIG. 1 of the drawings, the method of the invention utilizes a first cylindrical member 10 and a second cylindrical member 11. Each member is formed of a material having suitable mechanical characteristics for flexure suspension assemblies, such as a high yield steel, for example. The cylindrical member 10 is adapted to be concentrically disposed in a centrally located cylindrical aperture 12 which extends along the longitudinal axis Z of the member 11. The member 10 is also provided with a centrally disposed cylindrical aperture 13 which extends along the longitudinal axis Z of that member for convenience in forming the flexure joints. Member 10 has a first pair of single axis flexure joints 14A and 14B which are disposed on opposite sides of the member and which have their longitudinal axes parallel to the Z axis and their bending axes aligned with each other and coincident with the X axis. A second pair of single axis flexure joints 15A and 15B are disposed on opposite sides of the first member 10 and have their longitudinal axes substantially parallel to the Z axis and their bending axes coincident with the Y axis. The X and Y axes are orthogonally related to the Z axis as illustrated in the drawings. Accordingly, the four flexure joints are quadrantally disposed at 90° intervals around the periphery of the cylindrical member 10 and the bending axis of each joint is radially aligned with either the X or the Y axis. Each of the first and second pairs of flexure joints is formed by boring a pair of radially disposed, closely spaced and radially separated holes 16 in the cylindrical member 10, so that the four flexure joints are formed by boring eight of the holes 16. The term "boring" as used herein shall be deemed to mean drilling or grinding or any other suitable method of making the closely spaced holes which form the flexure joints. The central aperture 13 in the member 10 will facilitate the boring operation by decreasing the amount of metal or other material to be removed. The longitudinal or cylindrical axes of each pair of the radially separated holes 16 are spaced equidistant from and are parallel to one or the other of the X and Y axes, so that the bending axis of each joint is coincident with either the X or Y axis.

The operation of a single axis flexure joint may best be understood by reference to FIG. 2 of the drawings which shows a pair of closely spaced cylindrical holes 17 formed in a block 18 of suitable material. The longitudinal axes of the holes 17 lie in a plane defined by the A and B axes shown in the drawing and are parallel to and spaced equidistant from the B axis. The two holes 17 essentially divide the block into a first portion 18A and a second portion 18B which are joined together by a pair of outer legs 19 and a thin inner leg or section 20. When the outer legs 19 are broken as shown in the drawing, the portions 18A and 18B of the block are joined only by the thin section 20 which has a longitudinal axis L which is orthogonally related to the A and B axes. Since the cross sectional area of the thin section 20 is the smallest along the B axis where the holes are closest together, it is apparent that this is the bending axis of the section and that the portions 18A and 18B of the block may be rotated with respect to each other about the B axis. It is also apparent that the portions 18A and 18B of the block may not be rotated with respect to each other about either the A or L axes, so that the flexure joint formed by the section 20 is a single axis flexure joint having only one bending axis B which is perpendicular to both the longitudinal axis L of the joint and the axis of alignment A of the holes 17. The flexibility or stiffness of this type of joint will depend upon how closely the holes 17 are spaced from each other and upon the physical characteristics of the material of which the block 18 is made.

Referring again to FIG. 1 of the drawings, it is seen that a third pair of single axis flexure joints 21A and 21B are formed in the second cylindrical member 11. The flexure joints of this pair are disposed on opposite sides of the central aperture 12 of the member 11 and have their bending axes aligned and coincident with the Y axis. The longitudinal axes of these joints, however, are substantially perpendicular to the longitudinal axis Z of the cylindrical member 11. In a similar fashion, a fourth pair of single axis flexure joints 22A and 22B are also formed in the member 11 and have their bending axes aligned and coincident with the X axis and their longitudinal axes substantially perpendicular to the longitudinal axis Z of the member 11. The four flexure joints of the third and fourth pairs are each made by boring a pair of radially disposed, closely spaced and radially aligned holes 23 in the member 11, so that the longitudinal axes of these flexure joints are all substantially perpendicular to the longitudinal axis Z of the member. For reasons which will be explained hereinafter, four axially disposed and quadrantally located threaded holes 24 are also formed in the cylindrical member 11.

The next step in the method of the invention is the joining together in concentric relationship of the cylindrical members 10 and 11. The member 10 is concentrically disposed in the aperture 12 in member 11 with the bending axes of the first pair of flexure joints 14A and 14B and the fourth pair of flexure joints 22A and 22B in radial alignment and coincident with the X axis of member 11 and with the bending axes of the second pair of flexure joints 15A and 15B and the third pair of flexure joints 21A and 21B radially aligned and coincident with the Y axis of member 11. The joining together of the cylindrical members 10 and 11 produces a cylindrical, integrally-connected, composite member having a longitudinal axis Z. The cylinders may be joined by means, such as cementing or welding, for example, and the terms "joining" or "joined" as used herein shall be deemed to include cementing, welding or any other suitable method of forming an integral composite member. The composite cylindrical member which results from the joining operation is then separated into the separate flexure joints and other component parts of the flexure suspension assembly of the invention. The separation operation is usually carried out by a method known as electro discharge machining because of the complex nature of the cuts which must be made in the composite cylindrical member. This method of separation involves immersing the composite member in an electrolyte bath and utilizing cutting electrodes of various shapes to produce the required configuration of cuts. Since this method of separation is well known in the art, it will not be described further herein. However, the terms "separation" or "separating" as used herein shall be deemed to include not only electro discharge machining but also other types of cutting or machining operations which are capable of producing the component parts of the assembly shown herein.

The flexure suspension assembly of the invention after separation of the cylindrical composite member formed by cylinders 10 and 11 has been accomplished is shown in FIGS. 3 and 4 of the drawings wherein reference numeral 25 designates the seam between the joined cylindrical members 10 and 11. In the exploded perspective view of the assembly shown in FIG. 4 of the drawings, the component parts of the assembly are illustrated as being broken apart at the eight single axis flexure joints which interconnect the component parts in the actual assembly. As seen in FIGS. 3 and 4, the separation operation produces a cylindrical inner or central mounting member 26 which is elongated and has the longitudinal axis thereof coincident with the Z axis of the composite member formed by the joining of members 10 and 11. The inner mounting member 26 is adapted to be coupled to the rotatable spin shaft (not shown) of a gyroscope or other inertial device by means such as cementing or welding, for example, so that the inner mounting member will rotate with the spin shaft about the spin axis thereof. The spin shaft spin axis will therefore coincide with the Z axis shown in the drawings. The separation operation also produces an outer or closed mounting member 27 which is annular in shape and which comprises the outer peripheral portion of the composite cylinder from which it is derived. The annular outer member 27 is adapted to be coupled by cementing, welding or other suitable means to the flywheel (not shown) of the gyroscope or other inertial device. The outer mounting member 27 is concentrically disposed about the inner mounting member 26 and is spaced therefrom by an annular section or annulus of the composite cylindrical member. The separation operation divides the annular section or annulus into two segments comprising a first gimbal member 28 and a second gimbal member 29 which are substantially identical in shape and size.

Gimbal member 28 is a bifurcated member having two, substantially-parallel arm portions 30 and 31 which are disposed on opposite sides of the inner mounting member 26 and which are interconnectd at one end of the arm portions by a central portion 32 in which is located two of the threaded apertures 24 which were formed in the cylindrical member 11. The central portion 32 is also provided with a centrally disposed elongated slot 33 which is adapted to receive one end 34 of the inner mounting member 26. The first gimbal member 28 is coupled by the first pair of single axis flexure joints 14A and 14B to the inner mounting member 26 and by the third pair of flexure joints 21A and 21B to the outer mounting member 27. Flexure joint 14A is formed by a radially extending projection 35 on one side of the slot 33 in the gimbal member central portion 32 and by a radially extending projection 36 formed on one side of the other end 37 of the inner mounting member 26. Flexure joint 14B is formed by a radial projection 38 on the other side of the slot 33 and by a radial projection 39 on the other side of the mounting member 26 at the end 37 thereof. Since the bending axis of the first pair of single axis flexure joints 14A and 14B is coincident with the X axis and since the joints are disposed on opposite sides of the central mounting member 26, gimbal member 28 may be angularly rotated with respect to inner mounting member 26 about the X axis and will rotate or spin with the inner mounting member about the Z spin axis when the inner mounting member is connected to the gyroscope spin shaft. The arm portion 31 of gimbal member 28 is cut away at 40 so that a radially extending projection 41 is formed on the inner surface 42 of the outer mounting member 27. The projection 41 serves as one half of flexure joint 21A. The remaining half of flexure 21A is an integral part of the arm portion 31 of gimbal member 28. In a similar fashion, one portion of flexure joint 21B is formed as an integral part of gimbal member arm portion 30 and the other portion of the joint is formed by a radially extending projection 43 on the inner surface 42 of the outer mounting member 27, so that the third pair of flexure joints 21A and 21B are disposed on opposite sides of the annulus formed by the gimbal members 28 and 29. This provides both radial and axial support for the outer mounting member and causes the outer mounting member to rotate with the gimbal member 28 and the inner mounting member 28 about the Z spin axis. Since the bending axis of the third pair of joints 21A and 21B is coincident with the Y axis, the outer mounting member 27 may be angularly rotated about the Y axis with respect to the gimbal member 28.

Gimbal member 29 is substantially identical to gimbal member 28 and has a pair of substantially parallel arm portions 44 and 45 which are interconnected at one end thereof by a central portion 46. The gimbal member central portion 46, however, is located at the opposite end 37 of the inner mounting member 26 and is substantially perpendicular to the central portion 32 of gimbal member 28, so that when the gimbal members 28 and 29 are interleaved the arm portions 30, 31, 44 and 45 of the gimbals are quadrantally disposed about the spin axis Z and the central mounting member 26. The central portion 46 of gimbal member member 29 is provided with an elongated slot 47 which is oriented perpendicularly to the slot 33 in gimbal member 28, so that the slot 47 will receive the end 37 of the inner mounting member 26 and the radial projections 36 and 39 formed thereon and will permit gimbal member 29 to be rotated about the Y axis with respect to the inner mounting member 26. The second gimbal member 29 is connected by the second pair of single axis flexure joints 15A and 15B to the inner mounting member 26 and by the fourth pair of flexure joints 22A and 22B to the outer mounting member 27. Flexure joint 15A of the second pair is formed by a radially extending projection 48 on one side of the central portion 46 of gimbal member 29 and by a radially extending projection 49 on one side of inner mounting member 26 at the end 34 thereof. Flexure joint 15B is formed by a radially extending projection 50 on the opposite side of gimbal member central portion 46 and by a radially extending projection 51 on the other side of the inner mounting member 26 at the end 34 thereof, so that the flexure joints of the second pair are disposed on opposite sides of the inner mounting member and will cause the gimbal member 29 to rotate or spin with the inner mounting member about the spin axis Z. Since the bending axis of the second pair of joints 15A and 15B is coincident with the Y axis, the gimbal member 29 may be angularly rotated with respect to the inner mounting member 26 about the Y axis. Flexure joint 22A has one portion thereof formed by the gimbal member arm portion 44 and the other portion thereof formed by a radially extending projection 52 formed on the inner surface 42 of the outer mounting member 27. Flexure joint 22B is similarly formed by the gimbal member arm portion 45 and a radially extending projection 53 formed on the outer mounting member, so that the flexure joints of the fourth pair are disposed on opposite sides of the annulus formed by gimbal members 28 and 29 and the outer mounting member 27 will rotate about the spin axis Z with gimbal member 29 and the spin shaft mounting member 26. Since the bending axis of the fourth pair of flexure joints 22A and 22B is coincident with the X axis, outer mounting member 27 may be angularly rotated with respect to the second gimbal member 29 about the X axis.

The operation of the flexure suspension assembly of the invention may best be seen in FIG. 4 of the drawings wherein the Z axis is the spin axis for the gyroscope spin shaft and the two orthogonally related X and Y axes are the precession axes about which the flywheel must angularly rotate with respect to the Z axis of the spin shaft. From the foregoing description, it is believed apparent that the inerleaved gimbal members 28 and 29 are oppositely disposed, substantially identical segments of an annulus concentrically disposed about the inner mounting member 26 and the spin axis Z. Since the gimbal members 28 and 29 are coupled to the inner mounting member 26 by the first pair of flexure joints 14A and 14B and the second pair of flexure joints 15A and 15B, both gimbal members will rotate about the spin axis with the inner mounting member when the gyroscope spin shaft is rotated. Since the gimbal members 28 and 29 are also coupled to the outer mounting member 27 by the third pair of flexure joints 21A and 21B and the fourth pair of joints 22A and 22B, the outer or flywheel mounting member will also be rotated about the spin axis Z as the gyroscope spin shaft is rotated about that axis. When the gyroscope flywheel precesses about the X precession axis, the outer mounting member 27 will rotate about the X axis and will carry with it gimbal member 28 because of the rigid connection between gimbal member 28 and the outer mounting member provided by the third pair of flexure joints 21A and 21B and because of the alignment of the bending axis of the first pair of joints 14A and 14B with the X axis. Gimbal member 29, however, will remain stationary because the bending axis of the second pair of joints 15A and 15B is perpendicular to the X axis. The outer mounting member 27 will, however, be free to rotate about the X axis with respect to the fixed gimbal member 29 because the bending axis of the fourth pair of flexure joints 22A and 22B is coincident with the X axis. When the flywheel of the gyroscope precesses about the Y axis, it will carry with it gimbal member 29 because of the rigid connection between these members afforded by the fourth pair of flexure joints 22A and 22B and because the bending axis of the second pair of flexure joints 15A and 15B coincident with the Y axis. The gimbal member 28 will remain stationary however because the bending axis of the first pair of joints 14A and 14B is aligned with the X axis rather than the Y axis. The outer mounting member 27 will be permitted to rotate about the Y axis with respect to the stationary gimbal member 28 because the bending axis of the third pair of joints 21A and 21B is coincident with the Y axis. Accordingly, it is believed apparent that the flexure suspension assembly of the invention has 2° of angular rotational freedom about the X and Y axes and that the entire assembly may be rotated about the spin axis Z. Since the bending axes of the four pairs of flexure joints are aligned with either the X axis or the Y axis, the suspension assembly prevents translatory movement of the outer mounting member 27 with respect to the inner mounting member 26 along all three of the X, Y and Z axes.

As mentioned previously, two of the axially extending threaded holes 24 are provided in each of the gimbal members 28 and 29. Each of these apertures is adapted to receive one or more of the threaded cylindrical balance weights 60 which are shown in FIG. 5 of the drawings. Each balance weight may be screwed into the threaded aperture associated with that weight to a desired distance by means of the slot 61 formed in one end of the weight. The aperture 24 and threaded balance weights 60 combine to provide a means of adjusting the moment of inertia of each of the gimbal members 28 and 29. Since the moment of inertia of a rotating member depends upon the mass of the member and the distance from the axis of rotation of the mass, the moment of inertia could be adjusted by changing either or both of these variables. The threaded apertures 24 of each gimbal member are disposed in the central portion of the gimbal member and extend through the arm portions of the member which lie on either side of the spin axis Z. Accordingly, the threaded balance weights 60 could be made in different weights to control the mass of the gimbal member and may also be threadedly inserted into the apertures 24 to different points along the axial length of the apertures to control the distance between the mass of the gimbal member and its axis of rotation Z. This moment of inertial adjusting arrangement permits the gimbal member inertias to be tuned to reduce or eliminate any flexural restraints imposed upon gyroscope operation by the flexure suspension assembly. The 90° displacement of the gimbal members with respect to each other and the provision for inertial tuning permits the elimination of rectified error torques associated with angular and linear vibrations which occur at twice the flywheel spin speed. The adjustment is generally made for a predetermined spin speed.

The flexure suspension assembly of the invention is structurally strong and provides good radial and axial support without the imposition of substantial flexural restraints. Since the flexure joints are alternately positioned with respect to the flywheel, the flywheel is essentially supported radially by two radial flexure joints loaded in tension and two axial flexure joints loaded in shear. For example, as the inner mounting member 26 is rotated by the gyroscope spin shaft about the Z axis, the axial flexure joints 14A and 14B will be loaded in shear and the radial flexure joints 21A and 21B will be loaded in tension. Similarly, the axial joints 15A and 15B of the second gimbal member 29 will be loaded in shear and the radial flexure joints 22A and 22B will be loaded in tension. Axial support is provided by the four axial flexure joints 14A, 14B, 15A and 15B which are loaded in tension and by the four radial flexure joints 21A, 21B, 22A and 22B which are loaded in double bending. The good radial support provided by the flexure suspension assembly of the invention means that the stiffness of the flexure joints may be kept to a minimum, thereby minimizing the flexural restraints imposed upon gyroscope operation by the suspension assembly. Since the flexure joints 21A, 21B, 22A and 22B are loaded in tension under a radial load, they can utilize the excellent tension strength of steel and other materials and can be made with less stiffness and with a much lower flexural restraint than a flexure joint of comparable strength which is loaded in shear or double bending. The reduced flexural restraints reduces errors in gyroscope operation arising from spurious error torques and simplifies the tuning of the gimbal member inertias. Additionally, the method of the invention for making flexure suspension assemblies may be easily practiced without excessive handling of delicate parts since separation of the two cylindrical members 10 and 11 into the parts of the assembly is not carried out until after these two members are joined together. Consequently, the delicate flexure joints are protected from damage inherent in prior art methods where the individual cylinders are separated into component parts prior to joining. Finally, the inner mounting member 26 may be centrally mounted to the gyroscope spin shaft so that the flywheel inertial load is evenly supported at the shaft mounting surface. The large surface area provided by the end 34 of the inner mounting member 26 may be joined directly to the end of the gyroscope spin shaft.

It is believed apparent that many changes could be made in the construction and described uses of the foregoing flexure suspension assembly and many seemingly different embodiments of the invention could be constructed without departing from the scope thereof. For example, the particular configuration of the gimbal members and inner and outer mounting members could be varied to suit a particular application. Additionally, the suspension assembly could be utilized in single axis gyroscopes or other types of inertial devices having a flywheel and requiring at least one degree of angular rotational freedom. Accordingly, it is intended that all matter contained in the above description or shown in the accompanying drawings shall be interpreted as illustrative and not in a limiting sense.

What is claimed is:

1. A flexure suspension assembly comprising
  a. first mounting means having a first longitudinal axis;
  b. first gimbal means;
  c. a first pair of single axis flexure joints coupling said first gimbal means to said first mounting means for rotation therewith about said first longitudinal axis, said first flexure joints having a second longitudinal axis substantially parallel to said first longitudinal axis and a first bending axis orthogonal thereto to permit relative angular rotation between said first gimbal means and said first mounting means about said first bending axis;
  d. second gimbal means;
  e. a second pair of single axis flexure joints coupling said second gimbal means to said first mounting means for rotation therewith about said first longitudinal axis, said second flexure joints having a third longitudinal axis substantially parallel to said first longitudinal axis and a second bending axis orthogonal to said longitudinal axes and said first bending axis to permit relative angular rotation between said second gimbal means and said first mounting means about said second bending axis;
  f. second mounting means;
  g. a third pair of single axis flexure joints coupling said second mounting means to said first gimbal means having a fourth longitudinal axis substantially perpendicular to said first longitudinal axis and a third bending axis aligned with said second bending axis; and
  h. a fourth pair of single axis flexure joints coupling said second mounting means to said second gimbal means, said fourth single axis flexure joints having a fifth longitudinal axis substantially perpendicular to said first longitudinal axis and a fourth bending axis aligned with said first bending axis, whereby said first and second mounting means are coupled for rotation together about said first longitudinal axis and for relative angular rotation therebetween about both of said first and second axes.

2. A flexure assembly according to claim 1 for coupling the rotatable spin shaft and flywheel of inertial devices of the type having relative angular rotation between the shaft and flywheel about two precession axes orthogonally related to the spin axis and wherein said first mounting means are adapted to be coupled to said spin shaft for rotation therewith about said spin axis, said second mounting means are adapted to be coupled to said flywheel, said first longitudinal axis is said spin axis and first and second bending axes are aligned with said two precession axes.

3. A flexure suspension assembly as claimed in claim 1 further comprising
  means mounted on each of said first and second gimbal means for adjusting the moment of inertia thereof.

4. A flexure suspension assembly as claimed in claim 1 wherein
  said first mounting means comprises an elongated central mounting member having said second longitudinal axis aligned with said first longitudinal axis,
  each of said first and second gimbal means comprises a bifurcated gimbal member having two substantially parallel arm portions interconnected at one end thereof by a central portion, the arm portions of each gimbal member being disposed on opposite sides of said central mounting member, the central portions of said gimbal members being disposed at opposite ends of said central mounting member and being substantially perpendicular to each other, so that said gimbal member arm portions are radially disposed about said central mounting member in quadrantal relationship, and
  said second mounting means comprises a closed mounting member surrounding said first and second gimbal members.

5. A flexure suspension assembly as claimed in claim 1 wherein each of said first, second, third and fourth single axis flexure joint means comprises a pair of single axis flexure joints disposed on opposite sides of said first longitudinal axis.

6. A flexure suspension assembly as claimed in claim 4 wherein
  said central mounting member is cylindrical in shape,
  said first and second gimbal members are shaped as segments of an annulus concentrically disposed about said central mounting member, and said closed mounting member is annular in shape and concentrically disposed about the annulus formed by said gimbal members.

7. A flexure suspension assembly as claimed in claim 6 further comprising means mounted on the central portion of each of said first and second gimbal members for adjusting the moment of inertia thereof, said adjusting means comprising a balance weight member threadedly engaging an aperture formed in the gimbal member central portion.

8. A flexure suspension assembly as claimed in claim 6 wherein each of said first and second single axis flexure joint means comprises a pair of single axis flexure joints disposed on opposite sides of said central mounting member, and each of said third and fourth single axis flexure joint means comprises a pair of single axis flexure joints disposed on opposite sides of the annulus formed by said gimbal members.

9. A flexure suspension assembly as claimed in claim 8 wherein the pair of flexure joints of each of said first and second flexure joint means are connected between said central mounting member and the central portion of the gimbal member associated therewith, and the pair of flexure joints of each of said third and fourth flexure joint means are connected between said closed mounting member and the arm portions of the gimbal member associated therewith.

10. A flexure suspension assembly as claimed in claim 9 wherein said central mounting member, said first and second gimbal members, said closed mounting member and all of said single axis flexure joints means are separated from a cylindrical composite member formed by the joining together in concentric relationship of a first cylindrical member having said first and second single axis flexure joint means formed therein, and a second cylindrical member having a centrally disposed aperture therein adapted to receive said first cylindrical member and having said third and fourth single axis flexure joint means formed therein.

11. A flexure suspension assembly as claimed in claim 10 wherein each flexure joint of said first and second flexure joint means is formed by boring a pair of radially disposed, closely spaced and radially separated holes in said first cylindrical member, and each flexure joint of said third and fourth flexure joint means is formed by boring a pair of radially disposed, closely spaced and radially aligned holes in said second cylindrical member.

12. A flexure suspension assembly comprising:

a. an elongated cylindrical central mounting member having a first longitudinal axis;

b. first gimbal means shaped as a segment of an annulus;

c. first pair of single axis flexure joints disposed on opposite sides of said central mounting member coupling said first gimbal means to said central mounting member for rotation therewith about said first longitudinal axis, said first flexure joints having a second longitudinal axis substantially parallel to said first longitudinal axis and a first bending axis orthogonal thereto to permit relative angular rotation between said first gimbal means and said central mounting member about said first bending axis;

d. second gimbal means shaped as a segment of an annulus;

e. a second pair of single axis flexure joints disposed on opposite sides of said central mounting member coupling said second gimbal means to said central mounting member for rotation therewith about said first longitudinal axis, said second flexure joints having a third longitudinal axis substantially parallel to said first longitudinal axis and a second bending axis orthogonal to said third longitudinal axis and said first bending axis to permit relative angular rotation between said second gimbal means and said central mounting member about said second bending axis; and f. a closed annular mounting member concentrically surrounding said first and second gimbal means;

g. a third pair of single axis flexure joints disposed on opposite sides of said first longitudinal axis coupling said first gimbal means to said closed mounting member having a fourth longitudinal axis substantially perpendicular to said first longitudinal axis and a third bending axis aligned with said second bending axis; and h. a fourth pair of single axis flexure joints disposed on opposite sides of said first longitudinal axis coupling said second gimbal means to said closed mounting member having a fifth longitudinal axis substantially perpendicular to said first longitudinal axis and a fourth bending axis aligned with said first bending axis, whereby said central mounting member and closed mounting member are coupled for rotation together about said first longitudinal axis and for relative angular rotation therebetween about both of said first and second bending axes.

* * * * *